Sept. 5, 1967   L. S. TAYLOR ET AL   3,340,114
PROCESS OF MAKING FLOAT AND FLOAT ROD
Filed July 6, 1965   2 Sheets-Sheet 2
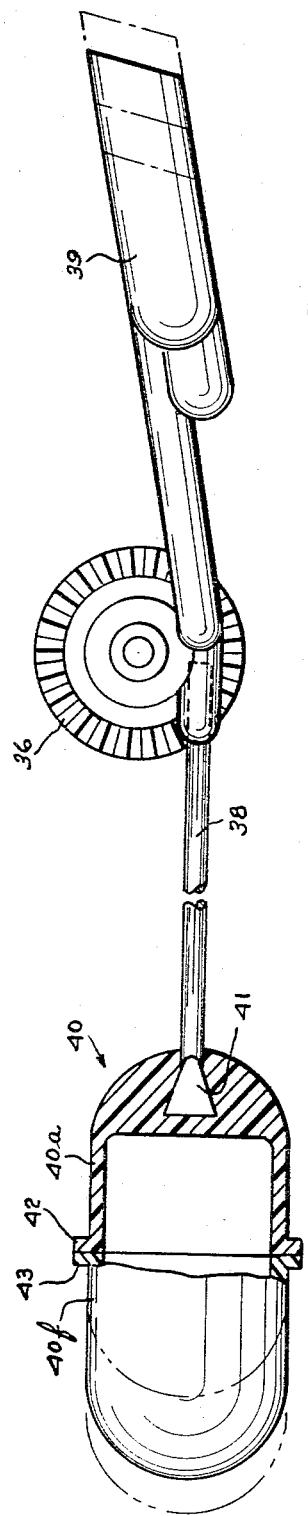
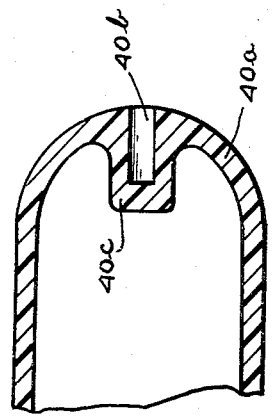
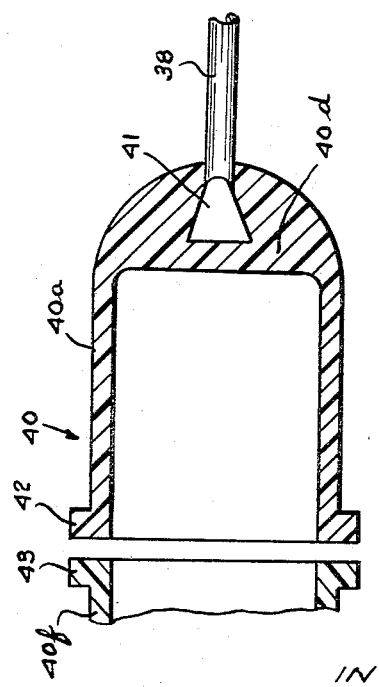
INVENTORS.
LETA S. TAYLOR
PAUL B. JOHNSON
EUGENE D. HUSKEY
BY
Raymond A. Paquin
ATTORNEY.

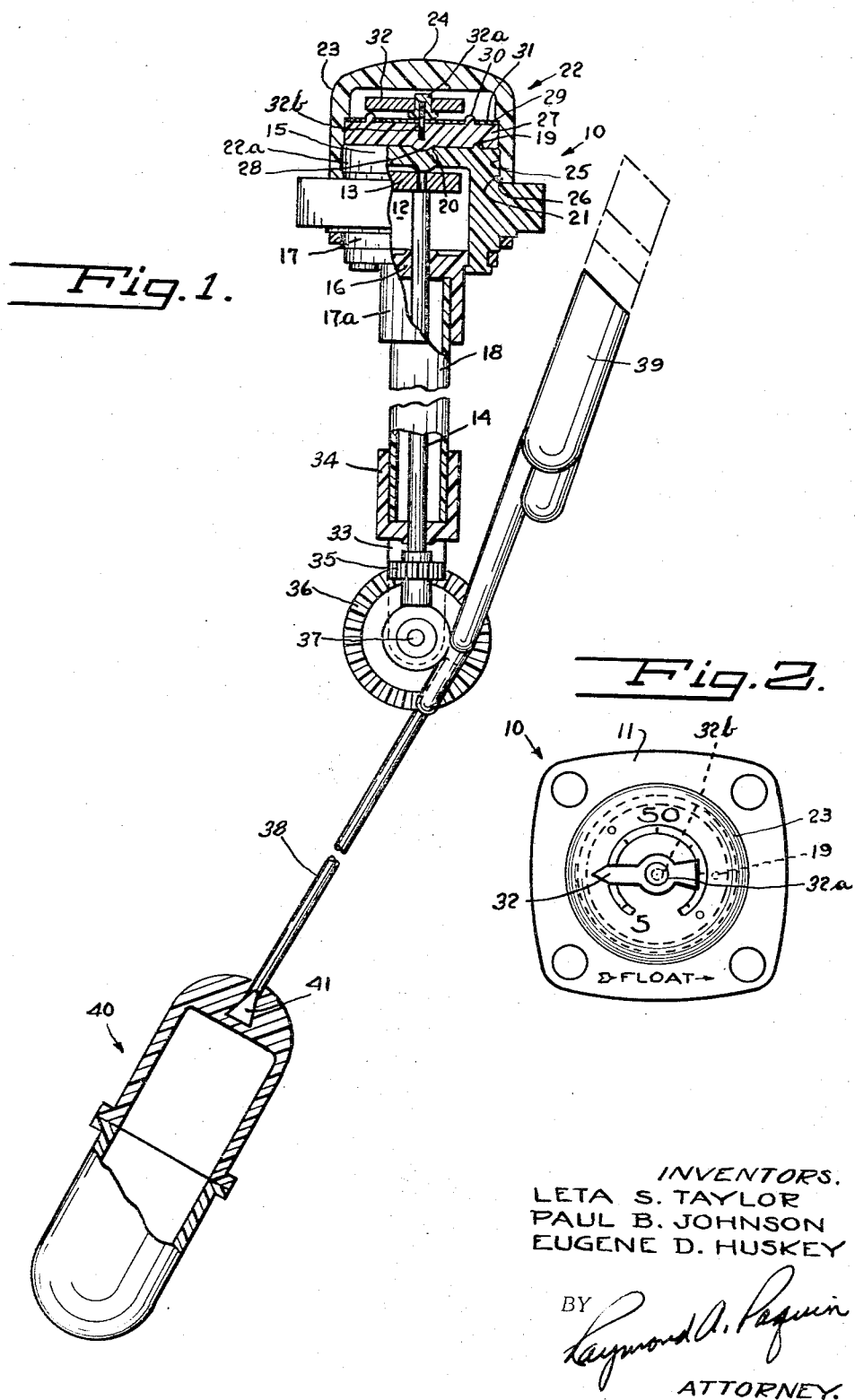

# United States Patent Office 3,340,114
Patented Sept. 5, 1967

3,340,114
PROCESS OF MAKING FLOAT AND FLOAT ROD
Leta S. Taylor, Paul B. Johnson, and Eugene D. Huskey, Garland, Tex., assignors to J. Y. Taylor Mfg. Company, a corporation of Texas
Filed July 6, 1965, Ser. No. 469,719
4 Claims. (Cl. 156—73)

This invention relates to liquid level gauges and has particular reference to a new and improved gauge and process of making same, which gauge is of the type adapted for use with storage tanks containing fluids or liquefied gases stored under pressure such as butane and propane.

An object of the invention is to provide a new and improved float arrangement for liquid level gauges of the type set forth which is simpler and more economical in construction, yet efficient in operation.

Another object is to provide a new and improved float arrangement of the type set forth which allows its use in a greater range of fluids without damage to the gauge components than prior type gauges.

Another object is to provide a new and improved float arrangement which may be adapted for use with various storage tanks and/or fluids or liquefied gases.

Another object is to provide a new and improved float arrangement for a liquid gauge, which float is adapted to withstand the internal pressures of gases in such tanks, and which float is relatively simple and economical in construction but will also resist chemical reaction from the liquefied gases or liquids in the tank, and which enables its uses in a greater range of liquids.

Another object is to provide a new and improved float for liquid level gauges which is formed of a material which will allow the assembly of components in such manner and by such process as to allow such components to become effectively integral.

Another object is to provide a float for a liquid level gauge wherein the parts normally subject to wear are made of a material which is wear resistant.

Another object is to provide a new and improved process of making a float for a liquid level gauge and for assembling said float.

Another object is to provide a new and improved process of assembling the components of a float for a liquid level gauge to obtain an effectively unitary construction.

Another object is to provide a new and improved float for liquid level gauges and process of making same, wherein all of the components may be made of relatively inexpensive material which is capable of manufacture by molding or casting and which may be so united as to form an effectively integral construction.

Other objects and advantages of the invention will be apparent from the following description taken in connection with the accompanying drawings wherein a preferred form of the invention and process are shown and described by way of illustration only.

Referring to the drawings:

FIG. 1 is a side view, partially in section, of a liquid level gauge embodying one form of the invention;

FIG. 2 is a top or plan view of the gauge head and indicator head of the gauge shown in FIG. 1;

FIG. 3 is a side view, partially in section of one form of float and float rod arrangement;

FIG. 4 is a fragmentray view illustrating a step in the process of the invention; and FIG. 5 is a fragmentary view illustrating a step in the the process of the invention.

Referring more particularly to the drawings wherein similar reference characters designate corresponding parts throughout the several views, the device shown embodying the invention comprises a gauge head designated generally at 10, having the rim 11 through which are provided openings for bolts or other suitable fastening means for securing the gauge head 10 in operative position over an opening in the storage tank. Gauge head 10 may be cast or molded of suitable plastic material, as hereinafter set forth, or die cast of aluminum or zinc depending upon the use intended.

Gauge head 10 is provided with chamber 12 for drive magnet 13 which is rigidly secured on the upper end of rotatably mounted shaft 14, whereby pivotal movement or rotation of shaft 14 effects simultaneous rotation or pivotal movement of drive magnet 13. Shaft or rod 14 may be of chemically resistant plastic as hereinafter specified.

The upper end of gauge head 10 is closed or sealed by wall 15 which is formed integral with gauge head 10.

The lower side of chamber 12 is closed by the wall of adapter 16 which is formed with integral hollow or tubular connector portion 17a depending therefrom to which is secured the upper end of tubular riser 18 which is in telescoping relation with connector portion 17a and secured thereto by bonding or staking. Adapter 16 has an opening for rod or shaft 14.

Connector or adapter 16 with tubular portion 17a is molded or cast of chemical resistant plastic as hereinafter specified.

Gauge head 10 is formed with depending tubular portion 17 in telescoping relation with portion 17a of adapter 16 and which are secured together mechanically or by bonding or adhesives.

The locating lug 19 is provided on the upper surface of wall 15 which is also provided with a central recess 20 and peripheral groove 21 which is formed beneath peripheral flange 22a.

The indicator head designated generally at 22 comprises gauge head crystal 23 which is molded or cast of clear, colorless, transparent plastic or other material such as glass, and may include a portion having curved surface contours 24 of such curvature as to provide desired magnification in such portion 24 to facilitate the reading or viewing of the indications on the dial.

Gauge head crystal 23 is provided with the peripheral groove 25 adapted to fit over peripheral flange 22a and may be secured thereto by suitable adhesive with rim or lug 26 positioned in peripheral groove 21 whereby the entrance of moisture or dust or the like into indicator head 22 is prevented.

Within indicator head 22 is provided dial plate 27 which has recesses in its lower surface for receiving locating lugs 19 to properly orient indicator head 22 on gauge head 10 and said dial plate 27 also may have a central offset portion 28 adapted to be positioned in recess 20 in the upper surface of wall 15.

Dial plate 27 is preferably made by molding or casting of suitable plastic or other material and secured in desired position in indicator head 22 against flange 29 by suitable bonding material or adhesive.

To locate the indicator head in desired or predetermined position on the gauge head there are provided on the upper surface of dial plate 27, the locating lugs 30 adapted to be positioned in corresponding openings in dial face 31 which may be formed of suitable metal such as aluminum or of other desired material such as molded or cast plastic and this dial face is provided with suitable indicia thereon whereby magnetic pointer 32 indicates on such dial face 31 the contents of the storage tank. Pointer 32 is carried by pointer hub 32a which in turn is mounted for pivotal movement on pivot 32b which is carried by dial plate 27.

The gauge head 10 is formed by casting or molding of suitable plastic material or die cast of aluminum zinc or other material depending upon the use to be made of the gauge.

Indicator head 22, including crystal 23, dial plate 27, dial face 31, pointer 32, pointer pin 32b and hub 32a are assembled to form a single self-contained and sealed indicator head which is pressed on to the gauge head and secured thereto by engagement of the rim or lug on the indicator head into the retaining groove in the gauge head.

The cast or molded plastic fork 33 has the tubular portion 34 adapted to receive the end of riser 18 and be secured thereto by staking or bonding by suitable chemical dependent upon the plastic material of which the fork 33 and riser 18 are constructed.

Shaft 14 has its end portion extending through an opening in the wall of fork 33 and on the end of said shaft 14 is positioned driven gear 35 which is formed of cast or molded plastic and either pinned to the drive shaft 14 or formed thereon in the case of a metal drive shaft or formed integral therewith in the case of a plastic drive shaft. The driven gear 35 is preferably formed of wear resistant material such as nylon.

The drive gear 36 is pivotally mounted on pivot 37 in fork 33. This drive gear 36 is preferably formed of wear resistant material such as nylon and meshes with driven gear 35 to thereby pivot drive shaft 14. Float rod 38 is a metal rod and counterweight 39 may be secured on a metal rod cast or molded to gear 36 which if a metal rod is employed can be plastic coated to render it more resistant to chemical reaction, or it can be of plastic and cast or molded integral with drive gear 36.

Float 40 is of chemically resistant plastic of the type of material herein set forth and is secured to metal float rod 38 in the following manner.

Float 40 may be molded or cast plastic in two members 40a and 40f as shown in FIGS. 1, 3 and 4 and indicated generally at 40, two portions 40a and 40f are provided with the flanges 42 and 43, respectively, which are united by spin welding or ultra-sonic welding to form an effectively integral float which does not leak.

In the manufacture of the float section 40a by molding the section has the opening 40b molded therein which extends into integral projection or reinforced portion 40c which is provided adjacent the end of float section 40a.

Opening or slot 40b is preferably of smaller cross section than float rod 38 and the end 41 of float rod 38 is flattened which causes it to become wedge shaped as shown in FIGS. 1, 3 and 4.

The float section 40a may have the reinforced or internal thickened end section 40d instead of projection 40c as the function of the two is the same, the only difference being in the amount of material required to manufacture the float section, as of course, the less material required the more economical the construction.

In the assembly of the float 40 to the float rod 38, either the rod 38 or the float 40 is heated and the rod 38 then has its end 41 positioned in projection 40c or thickened end 40d with the adjacent portion of rod 38 in slot 40b.

Upon cooling the end of float section 40a shrinks around the end of rod 38 forming an effectively united connection therebetween.

By controlling the size and weight of float portion 40b the float can be adapted to the particular gauge on which it is to be employed.

The float portions 40a and 40b are cast or molded of chemically resistant plastic such as those elsewhere specified herein.

The counterweight 39 can be cast of chemically resistant plastic and the mass or length can be controlled to control its weight.

In the manufacture of the liquid level gauge of this invention, the gauge head 10 may be formed of die cast metal such as aluminum or zinc or molded or cast of a plastic having sufficient strength such as nylon or an acrylontrile-butadiene-styrene composition which is relatively stable, tough, hard and rigid and withstands acids and pressure and resists weather.

Other plastics which might be employed depending upon the material with which the gauge is to be used are polycarbonates, polystyrenes, acrylics, vinyls or others with suitable properties.

Other parts, such as the indicator head, connector riser, fork, drive rod, and drive gears may also be formed of such plastic materials.

Drive magnet 13 and the end of shaft 14 are then placed in chamber 12 in gauge head 10 with shaft 14 extending through the opening in the wall of connector 16 to which connector 16 the end of riser 18 is secured as stated above.

Connector 16 is connected to gauge head 10 by bonding or by suitable adhesive of tubular portion 17a and portion 17 of gauge head 10.

Fork 33 is then secured on the end of riser 18 by staking or by bonding or by suitable adhesive to connect tubular portion 34 of fork 33 to the end of riser 18, with shaft 14 extending therethrough.

The unit consisting of drive gear 36, float rod 38, float 40 and counterweight 39 is then mounted on fork 33 by pivot pin 37 with gears 35 and 36 in meshing relation.

Where gear 35 is formed integral with shaft 14 it will be necessary to mount fork 33, riser 18 and connector 16 together as a unit before mounting drive magnet 13 on shaft 14 and then connecting this assembly to gauge head 10 as previously described.

The indicator head, which is formed as a unit, as described above is mounted on the upper side of gauge head 10 to complete the assembly.

As shown in the drawings, a suitable gasket is provided between the gauge head 10 and the storage tank to seal this connection.

From the foregoing it will be seen that we have provided new and improved means and process for obtaining all of the objects and advantages of the invention.

We claim:

1. The process of forming a float for a liquid level gauge comprising, forming two hollow float sections by molding chemically resistant plastic with one of said sections having a unitary reinforced portion adjacent its closed end and a groove extending into said reinforced portion and said sections having flanges adjacent their open ends, uniting said sections by joining said flanges, placing an end of a float rod in said groove while said rod or said reinforced portion is heated and allowing said arrangement to cool whereupon said reinforced section will shrink on said rod to effectively connect said rod and float.

2. The process of forming a float for a liquid level gauge comprising, forming two hollow float sections by molding chemically resistant plastic with one of said sections having a unitary reinforced portion adjacent its closed end and a groove extending into said reinforced portion and said sections having flanges adjacent their open ends, uniting said sections by joining said flanges by welding, placing an end of a float rod in said groove while said rod or said reinforced portion is heated and allowing said arrangement to cool whereupon said reinforced section will shrink on said rod to effectively connect said rod and float.

3. The process of forming a float for a liquid level gauge comprising, forming two hollow float sections by molding chemically resistant plastic with one of said sections having a unitary reinforced portion adjacent its closed end and a groove extending into said reinforced portion and said sections having flanges adjacent their open ends, uniting said sections by joining said flanges by spin welding, placing an end of a float rod in said groove while said rod or said reinforced portion is heated and allowing said arrangement to cool whereupon said reinforced section will shrink on said rod to effectively connect said rod and float.

4. The process of forming a float for a liquid level gauge comprising, forming two hollow float sections by molding chemically resistant plastic with one of said sections having a unitary reinforced portion adjacent its closed end and a groove extending into said reinforced portion and said sections having flanges adjacent their open ends, uniting said sections by joining said flanges by ultra-sonic welding, placing an end of a float rod in said groove while said rod or said reinforced portion is heated and allowing said arrangement to cool whereupon said reinforced section will shrink on said rod to effectively connect said rod and float.

References Cited

UNITED STATES PATENTS

| | | | |
|---|---|---|---|
| 589,449 | 6/1897 | Rockwell | 73—322.5 |
| 1,714,733 | 5/1929 | Shank | 73—322.5 |
| 2,358,472 | 9/1944 | Owens | 73—322.5 |
| 2,792,164 | 5/1957 | Cauffiel | 73—322.5 X |
| 2,992,560 | 7/1961 | Morgan et al. | 73—317 |
| 3,120,570 | 2/1964 | Kennedy et al. | 264—45 |
| 3,224,916 | 12/1965 | Soloff et al. | 156—73 |

FOREIGN PATENTS

| | | |
|---|---|---|
| 144,522 | 1/1952 | Australia. |

OTHER REFERENCES

"Fabricating with Frictional Heat," by Robert N. Freres, Modern Plastics, November 1945, pp. 142–144.

LOUIS R. PRINCE, *Primary Examiner.*

D. M. YASICH, *Assistant Examiner.*